(12) United States Patent
Qiao

(10) Patent No.: US 11,751,060 B2
(45) Date of Patent: Sep. 5, 2023

(54) IDENTITY RECOGNITION METHOD AND APPARATUS

(71) Applicant: BEIJING XIAOMI MOBILE SOFTWARE CO., LTD., Beijing (CN)

(72) Inventor: Guangjun Qiao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 67 days.

(21) Appl. No.: 17/486,690

(22) Filed: Sep. 27, 2021

(65) Prior Publication Data

US 2022/0295286 A1 Sep. 15, 2022

(30) Foreign Application Priority Data

Mar. 11, 2021 (CN) .......................... 202110266482.5

(51) Int. Cl.
| | |
|---|---|
| *G06F 21/00* | (2013.01) |
| *H04W 12/50* | (2021.01) |
| *H04W 12/63* | (2021.01) |
| *H04W 12/69* | (2021.01) |
| *H04W 12/069* | (2021.01) |
| *H04W 4/02* | (2018.01) |

(52) U.S. Cl.
CPC .......... *H04W 12/50* (2021.01); *H04W 4/023* (2013.01); *H04W 12/069* (2021.01); *H04W 12/63* (2021.01); *H04W 12/69* (2021.01)

(58) Field of Classification Search
CPC ... H04W 12/50; H04W 12/069; H04W 12/63; H04W 12/69; H04W 12/06; H04W 12/08; H04W 12/68; H04W 4/022; H04W 4/023; H04W 4/80; H04L 63/107; G06F 21/32; G06F 21/44; G06F 2221/2111; G01S 5/0284
See application file for complete search history.

(56) References Cited

U.S. PATENT DOCUMENTS

| | | | |
|---|---|---|---|
| 10,531,299 B1 | 1/2020 | Osborn et al. | |
| 2015/0294515 A1 * | 10/2015 | Bergdale | H04W 4/80 340/5.61 |

(Continued)

FOREIGN PATENT DOCUMENTS

| | | | | |
|---|---|---|---|---|
| DE | 102017109293 A1 * | 10/2018 | ........... | B60R 25/245 |
| DE | 102017109293 A1 | 10/2018 | | |

(Continued)

OTHER PUBLICATIONS

European Search Report in the European Application No. 21199888.5, dated Mar. 2, 2022, (8p).

*Primary Examiner* — Kendall Dolly
(74) *Attorney, Agent, or Firm* — Arch & Lake LLP

(57) ABSTRACT

An identity recognition method includes: establishing, by a first device, a connection with a second device in response to detecting that the second device enters a preset first distance range; performing identity authentication on the second device based on the connection; and determining that the second device is a device with a preset user authority in response to determining that the identity authentication is passed and detecting that the second device enters a preset second distance range and the second device is within a preset direction range of the first device; herein the preset second distance range is within the preset first distance range.

18 Claims, 6 Drawing Sheets

(56) References Cited

U.S. PATENT DOCUMENTS

| | | | |
|---|---|---|---|
| 2016/0337863 A1* | 11/2016 | Robinson | H04W 4/021 |
| 2020/0280853 A1* | 9/2020 | Osborn | H04W 24/10 |
| 2021/0120407 A1 | 4/2021 | Neuhoff et al. | |
| 2021/0126912 A1* | 4/2021 | MacLean | H04W 12/63 |
| 2021/0258796 A1* | 8/2021 | Li | G06Q 20/40145 |
| 2021/0385653 A1* | 12/2021 | Sau | H04L 9/0844 |
| 2022/0385650 A1* | 12/2022 | Kumar Agrawal | H04L 63/107 |

FOREIGN PATENT DOCUMENTS

| | | |
|---|---|---|
| EP | 3819174 A1 | 5/2021 |
| WO | 2020047868 A1 | 3/2020 |

* cited by examiner

IDENTITY RECOGNITION METHOD AND APPARATUS

CROSS-REFERENCE TO RELATED APPLICATIONS

This application is based upon and claims priority to Chinese patent application No. 202110266482.5, filed on Mar. 11, 2021, the entire content of which is incorporated herein by reference for all purposes.

TECHNICAL FIELD

The disclosure relates to the technical field of electronics, and more particularly, to an identity recognition method and apparatus, a device, and a storage medium.

BACKGROUND

With the development and progress of science and technology, the level of intelligence in production and life in modern society is getting higher, and demands for personnel recognition technologies in various fields such as smart homes, smart buildings, and smart cities become stronger.

Among common identity recognition technologies, there is an automatic identity recognition technology based on vision. For example, face recognition and gesture recognition, that is, the recognition is started when a recognized object triggers a recognition threshold, which is common in community access control, face payment, etc. There is also a passive identity recognition technology, such as radio frequency identification (RFID), a near field communication (NFC) reader, a fingerprint identification device, and an iris recognition device, which requires a recognized object to bring a device or a biometric feature that indicates identity information close to a recognition device to achieve identity recognition, and is commonly used in a ticket checking system, office area authority recognition, and the like.

SUMMARY

According to a first aspect of the disclosure, an identity recognition method is provided. The method is applied to a first device and includes: establishing a connection with a second device in response to detecting that the second device enters a preset first distance range; performing identity authentication on the second device based on the connection; and determining that the second device is a device with a preset user authority in response to determining that the identity authentication is passed and in response to detecting that the second device enters a preset second distance range and the second device is within a preset direction range of the first device; herein the preset second distance range is within the preset first distance range.

According to a second aspect of the disclosure, an identity recognition method is provided. The method is applied to a second device and includes: establishing a connection with a first device in response to entering a preset first distance range of the first device; performing identity authentication with the first device based on the connection; and when the identity authentication is passed, in response to entering a preset second distance range of the first device and the second device being within a preset direction range of the first device, acquiring a preset user authority; herein the preset second distance range is within the preset first distance range.

According to a third aspect of the present disclosure, a device is provided, which includes: a processor; and a memory configured to store instructions executable by the processor. The processor is configured to execute the identity recognition method as described in the first aspect or second aspect above.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Figure 1:
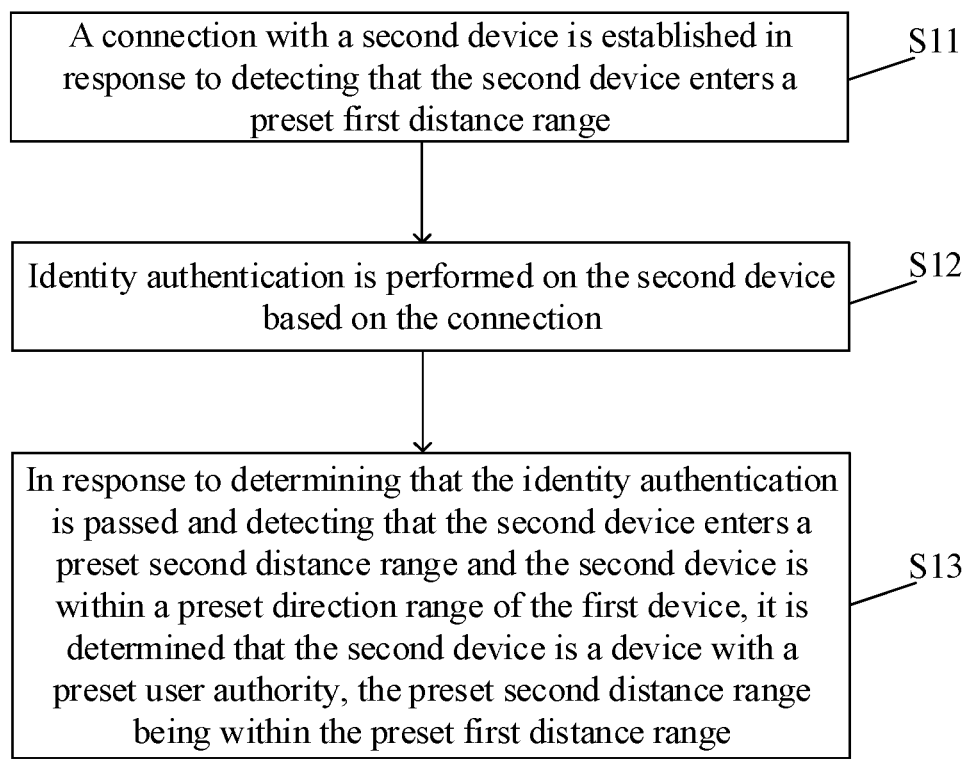
FIG. 1 is a first flow chart showing an identity recognition method, according to one or more examples of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The disclosure provides an identity recognition method and apparatus, a device, and a storage medium to solve those problems.

FIG. 1 is a first flow chart showing an identity recognition method, according to an example of the disclosure. As illustrated in FIG. 1, the identity recognition method is applied to a first device and includes as follows.

At S11, a connection with a second device is established in response to detecting that the second device enters a preset first distance range.

At S12, identity authentication is performed on the second device based on the connection.

At S13, in response to determining that the identity authentication is passed and detecting that the second device enters a preset second distance range and the second device is within a preset direction range of the first device, it is determined that the second device is a device with a preset user authority, the preset second distance range being within the preset first distance range.

In the example of the disclosure, the first device may be a terminal device having a positioning function, and the second device may be a mobile device such as a mobile phone or a tablet computer.

In an example, both the first device and the second device include UWB modules. The method further includes: whether the second device enters the preset first distance range or the preset second distance range is detected by means of the UWB modules.

In the example, the first device may position the second device through the UWB modules. For example, the first device has a multi-antenna UWB module, and the second device has a single-antenna or multi-antenna UWB module. With the built-in multi-antenna UWB module, the first device may not only position a distance of the second device, and may also position a direction of the second device.

It is to be noted that, the disclosure is not limited to positioning by using a UWB technology, for example, an ultrasonic technology may also be adopted for positioning.

At S11, the connection with the second device is established when the first device detects that the second device enters the preset first distance range. After detecting that the second device enters the preset first distance range, the first device may establish a connection with the second device through a Bluetooth mode, a Wi-Fi wireless communication mode, or a UWB mode.

After establishing the connection with the second device, the first device may perform the identity authentication on the second device at S12. It is to be noted that in the example of the disclosure, the purpose of performing the identity authentication on the second device is to verify whether the first device and the second device are devices in secure interaction.

At S13, when the identity authentication of the second device is passed, the first device detects that the second device enters the preset second distance range within the first distance range and the second device is within the preset direction range of the first device, and it is determined that the second device is the device with the preset user authority.

For example, the preset first distance range may be a distance range within 20 meters from the first device, and the direction is not limited. The preset second distance range is a distance range within 10 meters from the first device. The second device is within the preset direction range of the first device, and may be within the direction range at 0 to 20 degrees of the first device.

In another example, before the connection is established, the first distance range as well as the first direction range may be limited. For example, the preset first distance range may be a distance range within 20 meters from the first device, and the first direction range may be a direction range within an angle of 10 to 50 degrees to the first device. The preset second distance range is a distance range within 10 meters from the first device, while the second device is within a direction at 10 to 20 degrees of the first device.

In addition, in the example of the disclosure, the first device determines that the second device is the device with the preset user authority, and the preset user authority includes at least one of: a payment authority; an access control authority; a boarding authority; a viewing authority; or a seat authority.

Taking the payment authority as an example, in case where a user carries a mobile phone (i.e., a second device) to a subway gate (i.e., a first device), when detecting that the mobile phone is within 20 meters (i.e., a preset first distance), the gate establishes a connection with the mobile phone in advance, and completes identity confirmation, to learn location information of the mobile phone (i.e., a user) in real time. When the user approaches the gate, for example, at a distance less than 30 cm (i.e., a preset second distance range) and an angle within plus or minus 20 degrees (i.e., the second device is within the preset direction range of the first device), a deduction operation is invoked.

In another example, when a user carries a mobile phone to a checkout counter in a convenience store or a supermarket, a charge terminal establishes a connection with the mobile phone of the user, and learns location information of the mobile phone in real time after identity confirmation. When a distance condition is met and a cashier initiates a deduction operation, the deduction occurs. For example, the distance condition refers to being less than 20 cm, within an angle of plus or minus 30 degrees. It can be understood that under the limitation of the preset direction range in the disclosure, for example, abnormal deduction operations after passing through a gate may be reduced.

Taking the access control authority as an example, in an example, when a user carrying a mobile phone approaches an area to be entered, an access control terminal establishes a connection with the mobile phone of the user, and performs identity authentication on the mobile phone. When the identity authentication is successful, the access control terminal may learn location information of the user in real time. When the location information meets conditions such as a distance less than 20 cm, and an angle within plus or minus 5 degrees, an access control system, a lock, and the like are unlocked.

Taking the boarding authority and the seat authority as an example, in an example, when a train staff needs to check tickets, a ticket checking terminal is used to establish a connection with mobile phones of all or part of passengers on a train, and perform identity authentication on the mobile phones. Moreover, the ticket checking terminal may acquire booking information of passengers within 1 meter in front, so that the train staff can learn whether the passengers have tickets (i.e., whether they have the boarding authority), and locate and analyze the passengers whether actual seated positions are consistent with the booking information (the seat authority), without disturbing the passengers. The viewing authority is similar to the boarding authority, which will not be elaborated in the examples of the disclosure.

In the related art, payment is realized based on an electronic toll collection (ETC) system, but the solution is not sensitive to distance information of vehicles, leading to malicious rush to pass on the cost. However, if the solution of the present disclosure is adopted to determine the access control authority and the payment authority of the vehicles, relying on precise positioning functions, such as adopting UWB modules for positioning and performing two range confirmations, occurrence of rushing to pass on the cost can be reduced.

In addition, in the mainstream technology based on face recognition, a user wearing a mask needs to remove the mask or take out his mobile phone to scan a QR code for identity verification, which is inconvenient and depends on light of an acquisition environment. The above-mentioned problems all may lead to poor user experience. The solution of the disclosure does not depend on light conditions and does not require user's active cooperation, thereby bringing senseless experiences to the user, while being capable of supporting authentication of multiple users.

In summary, it can be understood that in the disclosure, by setting the preset first distance range, the connection with the second device is established when the second device enters the preset first distance range, so that the identity authentication is performed on the second device; when the identity authentication is passed, it is determined that the second device is the device with the preset user authority based on that the second device enters the preset direction range and the preset second distance range within the preset first distance range. On the one hand, the identity authentication is performed followed by authority granting in combination with spatial extent, which can strengthen security in identity recognition; on the other hand, both dependence on light conditions and requirement for active cooperation of the user are omitted, so that a senseless user experience can be provided; and moreover, preset user authority confirmation for multiple devices simultaneously may be supported, so that identity authentication efficiency can be improved.

In an example, the operation that the identity authentication on the second device is performed based on the connection includes: the identity authentication is performed on the second device by exchanging a key with the second device based on the connection.

In the example, a secure storage area or similar secure execution environment, for storing a key, is provided in each of the first device and the second device; the stored keys are used for verifying the identity of each other; and the first device and the second device realize identity authentication by exchange their stored keys. The identity authentication based on the keys may adopt symmetrical keys or asymmetrical keys. In addition, key generation and distribution may be performed by burning when the devices are produced in a factory, and may also be subjected to public exchange based on a certificate. The identity certificate based on keys may be performed by following a General Purpose GP protocol such as secure copy protocol (SCP) 02/03 or SCP10/11.

For example, the first device and the second device acquire each other's public key after certificate exchange based on the connection, and then respectively calculate the stored private key and the other's public key based on a preset algorithm so as to generate keys; and when the keys respectively generated by the first device and the second device are the same, it is determined that the identity authentication on the second device is passed.

In an example, the operation that the connection with a second device is established in response to detecting that the second device enters the preset first distance range includes: distances between each second device and the first device are sorted in response to detecting that a plurality of second devices enter the preset first distance range; and a preset number of second devices are selected to establish the connection with the preset number of second devices based on the sorting, a distance between any of the preset number of second devices that are selected and the first device being less than a distance between any of second devices that are not selected and the first device.

In the example of the disclosure, there may be a plurality of second devices entering the preset first distance range, due to limited communication capacity of the first device, the first device may only be connected/coupled to part of second devices that enter the preset first distance range.

Thus, in the disclosure, distances between each second device and the first device are sorted when it is detected that the plurality of second devices enter the preset first distance range, and a preset number of second devices that are of a small distance are selected for connection establishment.

It can be understood that the closer the distance to the first device, the greater the possibility that the second device will enter the preset second distance range, and the greater the likelihood that a user carrying the second device will want to acquire the preset user authority. Therefore, in the disclosure, after distance sorting, a preset number of second devices with a smaller distance are selected to establish a connection, and then whether the selected second devices enter the preset second distance range is detected, so that rationality of monitoring to the second devices is improved on the basis of the limited communication capacity, thereby improving identity recognition efficiency.

In an example, the method further includes: user identity information stored in the second device is acquired based on the connection; the operation that in response to detecting that the second device enters the preset second distance range and the second device is within the preset direction range of the first device, it is determined that the second device is the device with the preset user authority includes: in response to detecting that the second device enters the preset second distance range, the second device is within the preset direction range of the first device, and the user identity information belongs to preset target user identity information, it is determined that the second device is the device with the preset user authority, the preset target user identity information referring to identity information of a user having the preset user authority.

In the example of the disclosure, different from subway gates and other public facilities, the community access control is aimed at specific user groups, for example, only users in this community have an access control authority, so that not only identity authentication on the second device but also verifying whether the user holding the second device meets conditions are required.

Thus, the second device of the disclosure can store user identification information. The identification information is, for example, a user name or ID number. The first device acquires the user identification information stored in the second device based on the connection, and only when detects that the second device enters the preset second distance range and is within the preset direction range of the first device, and the user identification information belongs to preset target user identification information, determines that the second device is the device with the preset user authority.

It can be understood that in the disclosure, by acquiring the user identity information stored in the second device and further verifying the user identity information, security in identity authentication can be improved.

In an example, the operation that in response to detecting that the second device enters the preset second distance range and the second device is within the preset direction range of the first device, it is determined that the second device is the device with the preset user authority includes: in response to detecting that the second device enters the preset second distance range and the second device is within the preset direction range of the first device, a ticket checking instruction is sent to the second device based on the connection; booking information of the second device is acquired based on the ticket checking instruction; and in response to determining that the booking information matches preset booking information, it is determined that the second device is the device with the preset user authority, the preset user authority indicating that a user carrying the second device has a boarding authority or a viewing authority.

Taking the boarding authority or the viewing authority as an example, in the example, the first device may be a ticket checking terminal. The ticket checking terminal sends a ticket checking instruction to the second device after detecting that the second device enters the preset second distance range. The ticket checking instruction may be triggered to actively send to the second device based on detecting that the second device enters the preset second distance range and the second device is within the preset direction range of the first device; or the ticket checking instruction may be sent after the ticket checking terminal receives an operation performed by a user based on prompt information that is output after the first device detects that the second device enters the preset second distance range and the second device is within the preset direction range of the first device; the example of the disclosure is not limited to this.

After sending the ticket checking instruction to the second device, the first device may receive the booking information fed back by the second device. When the booking information matches the preset booking information, it is determined that the second device is the device with the preset user authority.

For example, when the booking information received by the ticket checking terminal is the same as the preset booking information, it is determined that a user carrying the second device has a boarding authority. The booking information includes: boarding time, start location, train number information, and the like.

For another example, the booking information includes: movie name, viewing time, theater name, etc. When the booking information received by the ticket checking terminal is the same as the preset booking information, it is determined that a user carrying the second device has a viewing authority.

It can be understood that, by adopting the solution of the present disclosure, the staff can learn the booking information of users entering the preset second distance range through the ticket checking terminal so as to check tickets without disturbing the users, the characteristic of intelligence is achieved, and the user experience can be improved.

In an example, the booking information includes seat number information. The operation that in response to detecting that the second device enters the preset second distance range and the second device is within the preset direction range of the first device, it is determined that the second device is the device with the preset user authority includes: in response to detecting that the second device enters the preset second distance range and the second device is within the preset direction range of the first device, a seat number of the second device in a space where the second device is located is determined, according to a relative distance, a relative direction, and a preset corresponding relationship between the second device and the first device, the preset corresponding relationship including a corresponding relationship between a distance, a direction and a seat number; in response to determining that the seat number matches a seat number in the booking information, it is determined that the second device is the device with the preset user authority, the preset user authority indicating that a user carrying the second device has a seat authority.

In the example of the disclosure, the booking information includes the seat number information. When detecting that the second device enters the preset second distance range and the second device is within the preset direction range of the first device, the first device will determine a seat number of the second device in a space where the second device is located, according to the relative distance, the relative direction, and the preset corresponding relationship between the second device and the first device. For example, according to the relative distance and relative direction between the first device and the second device, the row number and seat number of the second device in a train car, or the row number and seat number of the second device in a movie theater is determined based on the preset correspondence relation.

It can be understood that the solution of the disclosure applied to actual scenes that require precise positioning can reduce manual operations and statistics, and has the characteristic of intelligence.

Figure 2:
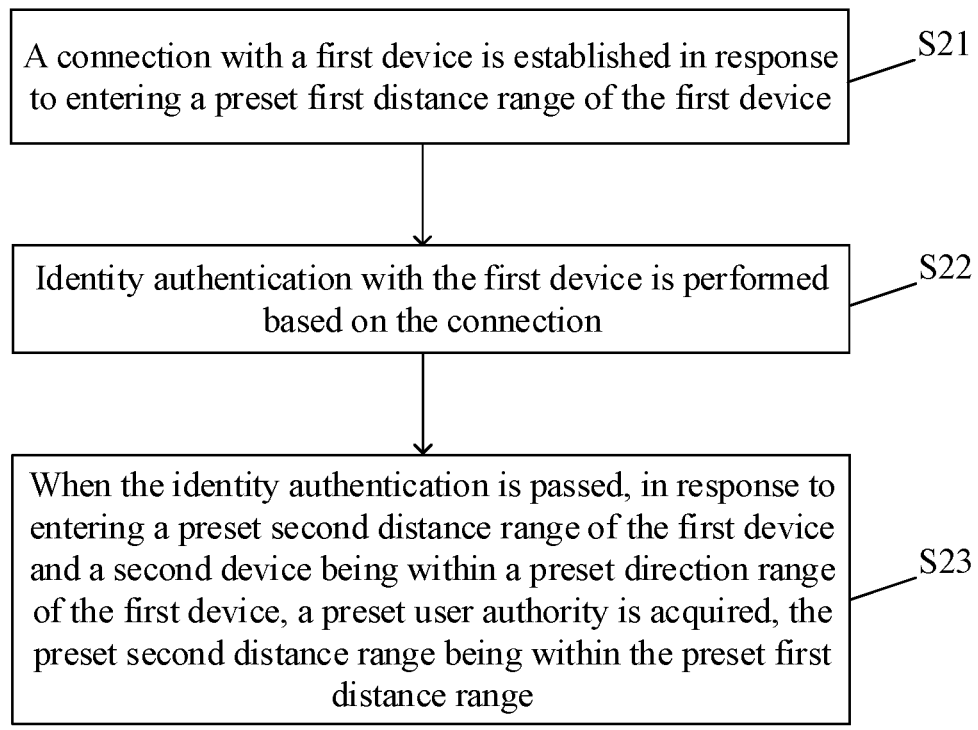
FIG. 2 is a second flow chart showing an identity recognition method, according to one or more examples of the disclosure.

FIG. 2 is a second flow chart showing an identity recognition method, according to an example of the disclosure. As illustrated in FIG. 2, the identity recognition method is applied to a second device and includes as follows.

At S21, a connection with a first device is established in response to entering a preset first distance range of the first device.

At S22, identity authentication with the first device is performed based on the connection.

At S23, when the identity authentication is passed, in response to entering a preset second distance range of the first device and the second device being within a preset direction range of the first device, a preset user authority is acquired, the preset second distance range being within the preset first distance range.

In the example of the disclosure, the second device may be a mobile device such as a mobile phone or a tablet computer, and the first device may be a terminal device having a positioning function.

In an example, both the first device and the second device include UWB modules, and the UWB modules are used for the first device to determine whether the second device enters the preset first distance range or the preset second distance range.

As set forth, the first device may have a multi-antenna UWB module, and the second device may have a single-antenna or multi-antenna UWB module. With the built-in multi-antenna UWB module, the first device may not only position a distance of the second device, and may also position a direction of the second device.

At S21, the second device establishes the connection with the first device when entering the preset first distance range of the first device. For example, the connection is established based on a Bluetooth mode, a Wi-Fi wireless communication mode, or a UWB mode.

After establishing the connection with the second device, at S22, the second device may perform the identity authentication with the first device based on the connection.

In an example, the operation that the identity authentication with the first device is performed based on the connection includes: the identity authentication is performed by exchanging a key with the first device based on the connection.

In the example, a secure storage area or similar secure execution environment, for storing a key, is provided in each of the first device and the second device; the stored key(s) may be used for verifying the identity of each other; and the first device and the second device realize identity authentication by exchanging their stored keys.

For example, the first device and the second device acquire each other's public key after certificate exchange based on the connection, and then respectively calculate the stored private key and the other's public key based on a preset algorithm so as to generate keys; and when the keys respectively generated by the first device and the second device are the same, it is determined that the identity authentication is passed.

At S23, when the identity authentication is passed, in response to entering the preset second distance range of the first device and the second device being within the preset direction range of the first device, the second device acquires a preset user authority. The preset user authority is as mentioned above, which will not be elaborated here.

It can be understood that in the disclosure, by setting the preset first distance range, the second device establishes the connection with the first device in response to entering the preset first distance range, so as to perform the identity authentication; when the identity authentication is passed, in response to entering the preset direction range and the preset second distance range within the preset first distance range, the second device further acquires the preset user authority. On the one hand, the identity authentication is performed followed by authority granting in combination with spatial extent, which can strengthen security in identity recognition; on the other hand, both dependence on light conditions and requirement for active cooperation of the user are omitted, so that a senseless user experience can be provided; and moreover, preset user authority confirmation for multiple devices simultaneously may be supported, so that identity authentication efficiency can be improved.

In an example, the operation that in response to entering the preset second distance range of the first device and the second device being within the preset direction range of the first device, the preset user authority is acquired includes: in response to entering the preset second distance range of the first device and the second device being within the preset direction range of the first device, stored user identity information is sent to the first device based on the connection, herein the user identity information is used for determining that the second device is a device with a preset user authority in case that the first device determines that the user identity information belongs to preset target user identity information, the preset target user identity information referring to identity information of a user having the preset user authority.

In the example of the disclosure, different from subway gates and other public facilities, the community access control is aimed at specific user groups, for example, only users in this community have an access control authority, so that not only identity authentication on the second device but also verifying whether the user holding the second device meets conditions are required.

Thus, the second device of the disclosure can store user identification information. The identification information is, for example, a user name, ID number or the like. The second device is triggered to send the stored user identification information to the first device in response to entering the preset second distance range of the first device and being within the preset direction range of the first device, so that when detecting that the user identification information belongs to the preset target user identification information, the first device determines that the second device is the device with the preset user authority.

It can be understood that in the disclosure, by sending the user identity information to the first device to allow the first device to verify the user identity information, security in identity authentication can be improved.

In an example, the operation that in response to entering the preset second distance range of the first device and the second device being within the preset direction range of the first device, a preset user authority is acquired includes: in response to entering the preset second distance range of the first device and the second device being within the preset direction range of the first device, a ticket checking instruction sent by the first device is received based on the connection; and booking information is sent to the first device according to the ticket checking instruction; herein the booking information is used for, when the first device determines that the booking information matches preset booking information, determining that the second device is a device with a preset user authority, the preset user authority indicating that a user carrying the second device has a boarding authority or a viewing authority.

Taking the boarding authority or the viewing authority as an example, in the example, the first device may be a ticket checking terminal. The ticket checking terminal sends a ticket checking instruction to the second device after detecting that the second device enters the preset second distance range.

After receiving the ticket checking instruction, the second device may send booking information to the first device, so that when determining that the booking information matches the preset booking information, the first device determines that the second device is the device with the preset user authority.

For example, when the booking information received by the ticket checking terminal is the same as the preset booking information, it is determined that the user carrying the second device has a boarding authority. The booking information includes: boarding time, start location, train number information, and the like.

For another example, the booking information includes: movie name, viewing time, theater name, etc. When the booking information received by the ticket checking terminal is the same as the preset booking information, it is determined that a user carrying the second device has a viewing authority.

It can be understood that with the solution of the present disclosure, the second device sends the booking information to the first device without disturbing the user, which facilitates ticket checking through the first device, thus the characteristic of intelligence is achieved, and the user experience can be improved.

Figure 3:
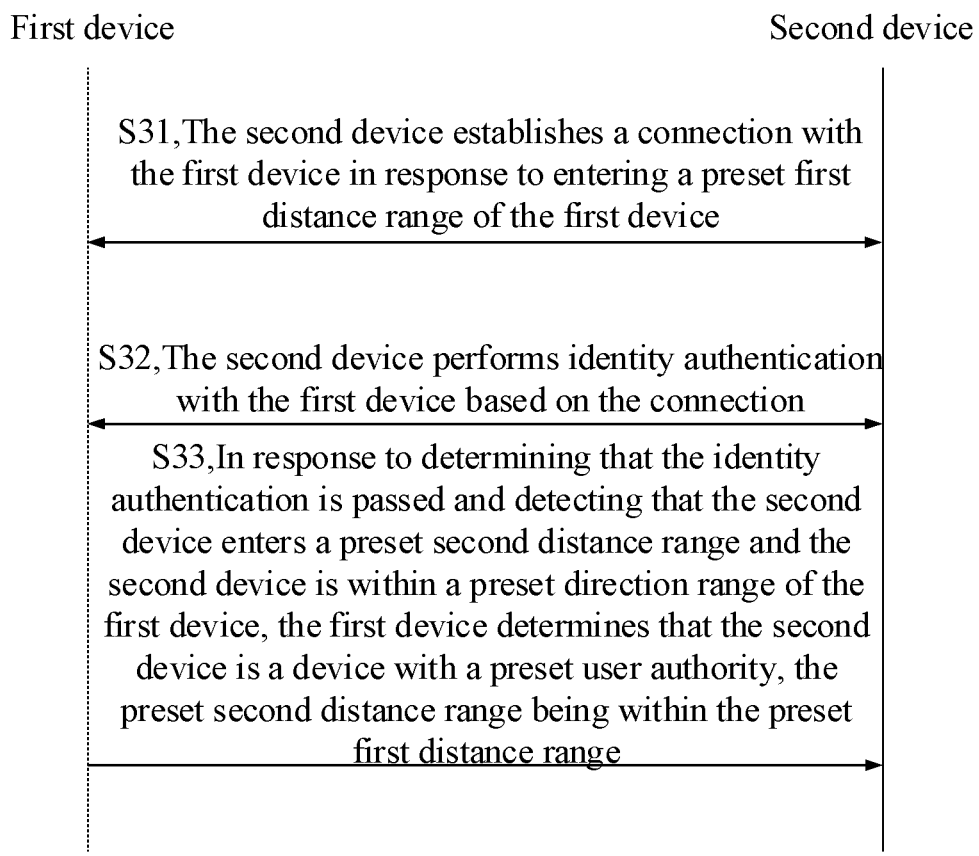
FIG. 3 is an interaction example diagram of an identity recognition method, according to one or more examples of the disclosure.

FIG. 3 is an interaction example diagram of an identity recognition method, according to an example of the disclosure. As illustrated in FIG. 3, the identity recognition method is applied to a first device and a second device and includes as follows.

At S31, the second device establishes a connection with the first device in response to entering a preset first distance range of the first device.

At 32, the second device performs identity authentication with the first device based on the connection.

At S33, in response to determining that the identity authentication is passed and detecting that the second device enters a preset second distance range and the second device is within a preset direction range of the first device, the first device determines that the second device is a device with a preset user authority, the preset second distance range being within the preset first distance range.

In the example of the disclosure, the first device may be a terminal device having a positioning function, and the second device may be a mobile device such as a cellphone or a tablet computer.

In the disclosure, by setting the preset first distance range, a connection with the second device is established when the second device enters the preset first distance range, so that identity authentication is performed on the second device; when the identity authentication is passed, it is determined that the second device is the device with the preset user authority when the second device enters the preset direction range and the preset second distance range within the preset first distance range. On the one hand, identity authentication is performed followed by authority granting in combination with spatial extent, which can strengthen security in identity recognition; on the other hand, both dependence on light conditions and requirement for active cooperation of the user are omitted, so that a senseless user experience can be provided; and moreover, preset user authority confirmation for multiple devices simultaneously may be supported, so that identity authentication efficiency can be improved.

Figure 4:
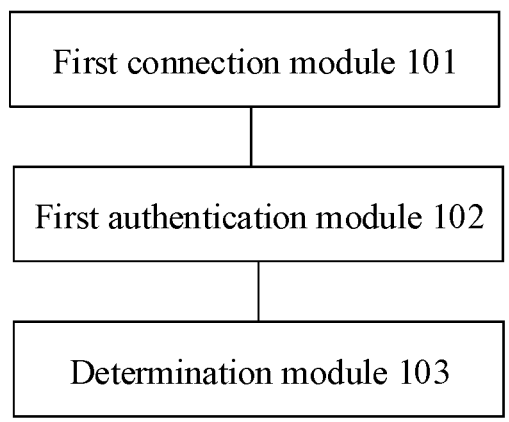
FIG. 4 is a first diagram of an identity recognition apparatus, according to one or more examples of the present disclosure.

FIG. 4 is a first diagram of an identity recognition apparatus, according to an example. Referring to FIG. 4, the identity recognition apparatus applied to a first device includes: a first connection module 101, a first authentication module 102 and a determination module 103.

The first connection module 101 is configured to establish a connection with a second device in response to detecting that the second device enters a preset first distance range.

The first authentication module 102 is configured to perform identity authentication on the second device based on the connection.

The determination module 103 is configured to determine that the second device is a device with a preset user authority, in response to determining that the identity authentication is passed and detecting that the second device enters a preset second distance range and the second device is within a preset direction range of the first device; herein the preset second distance range is within the preset first distance range.

In some examples, the first authentication module 102 is further configured to perform the identity authentication on the second device by exchanging a key with the second device based on the connection.

In some examples, the first connection module 101 is further configured to sort distances between each second device and the first device in response to detecting that a plurality of second devices enter the preset first distance range; and select a preset number of second devices to establish the connection with the preset number of second devices based on the sorting; herein a distance between any of the preset number of second devices that are selected and the first device is less than a distance between any of second devices that are not selected and the first device.

In some examples, the apparatus further includes: a first acquisition module 104, configured to acquire user identity information stored in the second device based on the connection. The determination module 103 is further configured to determine that the second device is the device with the preset user authority, in response to detecting that the second device enters the preset second distance range, the second device is within the preset direction range of the first device, and the user identity information belongs to preset target user identity information, herein the preset target user identity information refers to identity information of a user having the preset user authority.

In some examples, the preset user authority includes at least one of: a payment authority; an access control authority; a boarding authority; a viewing authority; or a seat authority.

In some examples, the determination module 103 is further configured to, in response to detecting that the second device enters the preset second distance range and the second device is within the preset direction range of the first device, send a ticket checking instruction to the second device based on the connection; acquire booking information of the second device based on the ticket checking instruction; in response to determining that the booking information matches preset booking information, determine that the second device is the device with the preset user authority; herein the preset user authority indicates that a user carrying the second device has a boarding authority or a viewing authority.

In some examples, the booking information includes seat number information. The determination module 103 is further configured to, in response to detecting that the second device enters the preset second distance range and the second device is within the preset direction range of the first device, determine a seat number of the second device in a space where the second device is located according to a relative distance, a relative direction, and a preset corresponding relationship between the second device and the first device, the preset corresponding relation including a corresponding relationship between a distance, a direction and a seat number; and in response to determining that the seat number matches a seat number in the booking information, determine that the second device is the device with the preset user authority; herein the preset user authority indicates that a user carrying the second device has a seat authority.

In some examples, both the first device and the second device include UWB modules, and the apparatus further includes: a detection module 105, configured to detect whether the second device enters the preset first distance range or the preset second distance range by means of the UWB modules.

Figure 5:
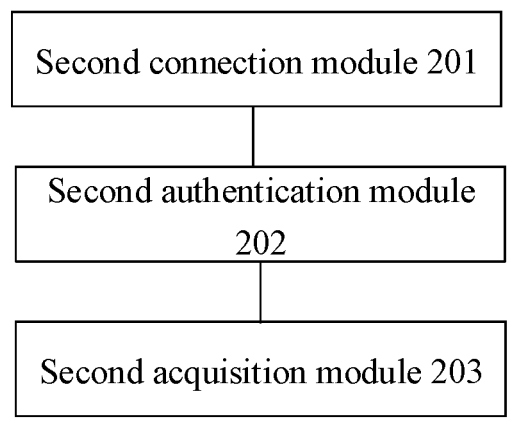
FIG. 5 is a second diagram of an identity recognition apparatus, according to one or more examples of the present disclosure.

FIG. 5 is a second diagram of an identity recognition apparatus, according to an example. Referring to FIG. 5, the identity recognition apparatus is applied to a second device and includes: a second connection module 201, a second authentication module 202 and a second acquisition module 203.

The second connection module 201 is configured to establish a connection with a first device in response to entering a preset first distance range of the first device.

The second authentication module 202 is configured to perform identity authentication with the first device based on the connection.

The second acquisition module 203 is configured to, when the identity authentication is passed, in response to entering a preset second distance range of the first device and the second device being within a preset direction range of the first device, acquire a preset user authority; herein the preset second distance range is within the preset first distance range.

In some examples, the second authentication module 202 is further configured to perform the identity authentication with the first device by exchanging a key with the first device based on the connection.

In some examples, the second acquisition module 203 is further configured to send stored user identity information to the first device based on the connection, in response to entering the preset second distance range of the first device and the second device being within the preset direction range of the first device; herein the user identity information is used for determining that the second device is a device with a preset user authority in case that the first device determines that the user identity information belongs to preset target user identity information, and the preset target user identity information refers to identity information of a user having the preset user authority.

In some examples, the second acquisition module 203 is further configured to, in response to entering the preset second distance range of the first device and the second device being within the preset direction range of the first device, receive a ticket checking instruction sent by the first device based on the connection; and send booking information to the first device according to the ticket checking instruction; herein the booking information is used for, when the first device determines that the booking information matches preset booking information, determining that the second device is a device with a preset user authority, and the preset user authority indicates that a user carrying the second device has a boarding authority or a viewing authority.

In some examples, both the first device and the second device include UWB modules, and the UWB modules are used for the first device to determine whether the second device enters the preset first distance range or the preset second distance range.

Regarding the apparatus in the above example, the specific manner in which each module performs operations has been described in detail in the example about the method, and detailed descriptions are omitted herein.

Figure 6:
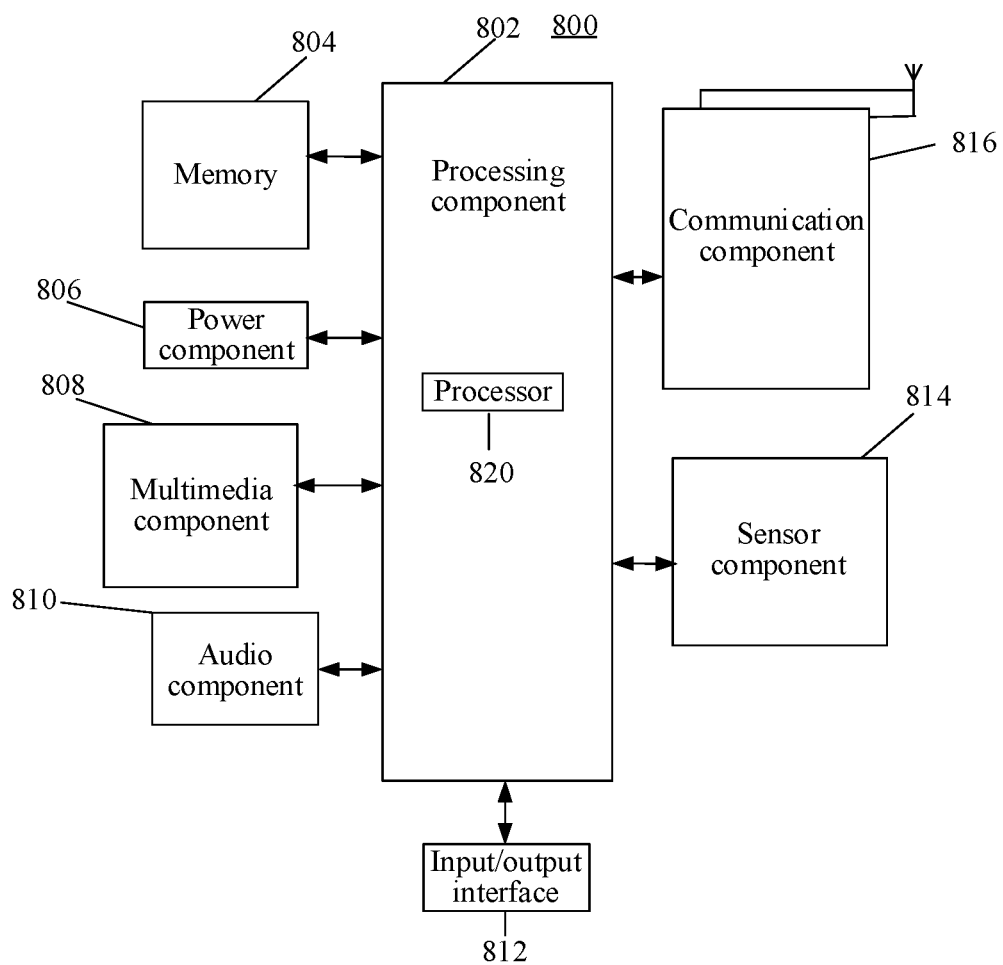
FIG. 6 is a block diagram of a device, according to one or more examples of the present disclosure.

FIG. 6 is a block diagram of a device, according to an example of the disclosure. For example, a device 800 may be a first device, and may also be a second device.

Referring to FIG. 6, the device 800 may include one or more of the following components: a processing component 802, a memory 804, a power component 806, a multimedia component 808, an audio component 810, an input/output (I/O) interface 812, a sensor component 814, or a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the described methods. Moreover, the processing component 802 may include one or more modules which facilitate interaction between the processing component 802 and other components. For example, the processing component 802 may include a multimedia module to facilitate interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power for various components of the device 800. The power component 806 may include a power management system, one or more power supplies, and other components associated with generation, management and distribution of power for the device 800.

The multimedia component 808 includes a screen providing an output interface between the device 800 and a user. In some examples, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some examples, the multimedia component 808 includes a front camera and/or a rear camera. The front camera and/or the rear camera may receive external multimedia data while the device 800 is in an operation mode, such as a photographing mode or a video mode. Each of the front camera and the rear camera may be a fixed optical lens system or have focusing and optical zooming capabilities.

The audio component 810 is configured to output and/or an input audio signal. For example, the audio component 810 includes a microphone (MIC) configured to receive an external audio signal when the device 800 is in an operation mode, such as a call mode, a recording mode, and a voice recognition mode. The received audio signal may further be stored in the memory 804 or sent via the communication component 816. In some examples, the audio component 810 further includes a speaker configured to output the audio signal.

The I/O interface 812 provides an interface between the processing component 802 and peripheral interface modules, such as a keyboard, a click wheel, buttons and the like. The buttons may include, but are not limited to: a home button, a volume button, a starting button, and a locking button.

The sensor component 814 includes one or more sensors configured to provide status assessments in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some examples, the sensor component 814 may also include an acceleration sensor, a gyroscope sensor, a magnetic sensor, a pressure sensor or a temperature sensor.

The communication component 816 is configured to facilitate wired or wireless communication between the device 800 and other devices. The device 800 may access a communication-standard-based wireless network, such as a wireless fidelity (WiFi) network, a 2nd-generation (2G) or 3rd-generation (3G) network or a combination thereof. In an example, the communication component 816 receives a broadcast signal or broadcast associated information from an external broadcast management system via a broadcast channel. In an example, the communication component 816 further includes a near field communication (NFC) module to facilitate short-range communications. For example, the NFC module may be implemented based on a radio frequency identification (RFID) technology, an infrared data association (IrDA) technology, a UWB technology, a Bluetooth (BT) technology and other technologies.

In examples, the device 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, and is configured to execute the above-described methods.

In examples, there is also provided a non-transitory computer-readable storage medium including instructions, such as included in the memory 804, executable by the processor 820 of the device 800 for performing the above described methods. For example, the non-transitory computer-readable storage medium may be a ROM, a random access memory (RAM), a compact disc read-only memory (CD-ROM), a magnetic tape, a floppy disc, an optical data storage device, and the like.

A non-transitory computer-readable storage medium is provided. When instructions in the storage medium are executed by a processor of a first device, the identification method can be executed. The method includes: a connection with a second device is established in response to detecting that the second device enters a preset first distance range; identity authentication is performed on the second device based on the connection; and in response to determining that the identity authentication is passed and detecting that the second device enters a preset second distance range and the second device is within a preset direction range of the first device, it is determined that the second device is a device with a preset user authority, the preset second distance range being within the preset first distance range.

Or, when instructions in the storage medium are executed by a processor of the second device, the second device can perform an identity recognition method. The method includes the following operations: a connection with a first device is established in response to entering a preset first distance range of the first device; identity authentication with the first device is performed based on the connection; and when the identity authentication is passed, in response to entering a preset second distance range of the first device and the second device being within a preset direction range of the first device, a preset user authority is acquired, the preset second distance range being within the preset first distance range.

An example of the disclosure provides an identity recognition method. The method is applied to a first device and includes: establishing a connection with a second device in response to detecting that the second device enters a preset first distance range; performing identity authentication on the second device based on the connection; and determining that the second device is a device with a preset user authority in response to determining that the identity authentication is passed and detecting that the second device enters a preset second distance range and the second device is within a preset direction range of the first device; herein the preset second distance range is within the preset first distance range.

In examples of the disclosure, the operation that the identity authentication is performed on the second device based on the connection may include: the identity authentication is performed on the second device by exchanging a key with the second device based on the connection.

In examples of the disclosure, the operation that the connection with the second device is established in response to detecting that the second device enters the preset first distance range may include: distances between each second device and the first device are sorted in response to detecting that a plurality of second devices enter the preset first distance range; and a preset number of second devices are selected to establish the connection with the preset number of second devices based on the sorting; herein a distance between any of the preset number of second devices that are selected and the first device may be less than a distance between any of second devices that are not selected and the first device.

In examples of the disclosure, the method may further include: user identity information stored in the second device is acquired based on the connection. The operation that in response to detecting that the second device enters the preset second distance range and the second device is within the preset direction range of the first device, it is determined that the second device is a device with a preset user authority may include: in response to detecting that the second device enters the preset second distance range, the second device is within the preset direction range of the first device, and the user identity information belongs to preset target user identity information, it is determined that the second device is the device with the preset user authority; herein the preset target user identity information may refer to identity information of a user having the preset user authority.

In examples of the disclosure, the preset user authority may include at least one of: a payment authority; an access control authority; a boarding authority; a viewing authority; or a seat authority.

In examples of the disclosure, the operation that in response to detecting that the second device enters the preset second distance range and the second device is within the preset direction range of the first device, it is determined that the second device is a device with a preset user authority may include: in response to detecting that the second device enters the preset second distance range and the second device is within the preset direction range of the first device, a ticket checking instruction is sent to the second device based on the connection; booking information of the second device is acquired based on the ticket checking instruction; and in response to determining that the booking information matches preset booking information, it is determined that the second device is the device with the preset user authority; herein the preset user authority may indicate that a user carrying the second device has a boarding authority or a viewing authority.

In examples of the disclosure, the booking information may include seat number information. The operation that in response to detecting that the second device enters the preset second distance range and the second device is within the preset direction range of the first device, it is determined that the second device is a device with a preset user authority may include: in response to detecting that the second device enters the preset second distance range and the second device is within the preset direction range of the first device, a seat number of the second device in a space where the second device is located is determined according to a relative distance, a relative direction, and a preset corresponding relationship between the second device and the first device; the preset corresponding relationship including a corresponding relationship between a distance, a direction and a seat number; and in response to determining that the seat number matches a seat number in the booking information, it is determined that the second device is the device with the preset user authority; herein the preset user authority may indicate that a user carrying the second device has a seat authority.

In examples of the disclosure, both the first device and the second device may include UWB modules, and the method may further include: whether the second device enters the preset first distance range or the preset second distance range is detected by means of the UWB modules.

An example of the disclosure provides an identity recognition method. The method is applied to a second device and includes: establishing a connection with a first device in response to entering a preset first distance range of the first device; performing identity authentication with the first device based on the connection; and when the identity authentication is passed, in response to entering a preset second distance range of the first device and the second device being within a preset direction range of the first device, acquiring a preset user authority; herein the preset second distance range is within the preset first distance range.

In examples of the disclosure, the operation that the identity authentication with the first device is performed based on the connection may include: the identity authentication is performed by exchanging a key with the first device based on the connection.

In examples of the disclosure, the operation that in response to entering the preset second distance range of the first device and the second device being within the preset direction range of the first device, a preset user authority is acquired may include: in response to entering the preset second distance range of the first device and the second device being within the preset direction range of the first device, stored user identity information is sent to the first device based on the connection; herein the user identity information may be used for determining that the second device is a device with a preset user authority in case that the first device determines that the user identity information belongs to preset target user identity information, and the preset target user identity information may refer to identity information of a user having the preset user authority.

In examples of the disclosure, the operation that in response to entering the preset second distance range of the first device and the second device being within the preset direction range of the first device, a preset user authority is acquired may include: in response to entering the preset second distance range of the first device and the second device being within the preset direction range of the first device, a ticket checking instruction sent by the first device is received based on the connection; and booking information is sent to the first device according to the ticket checking instruction; herein the booking information may be used for, when the first device determines that the booking information matches preset booking information, determining that the second device is a device with a preset user authority, and the preset user authority may indicate that a user carrying the second device has a boarding authority or a viewing authority.

In examples of the disclosure, both the first device and the second device may include UWB modules, and the UWB modules may be used for the first device to determine whether the second device enters the preset first distance range or the preset second distance range.

An example of the disclosure provides an identity recognition apparatus. The apparatus is applied to a first device and includes: a first connection module, configured to establish a connection with a second device in response to detecting that the second device enters a preset first distance range; a first authentication module, configured to perform identity authentication on the second device based on the connection; and a determination module, configured to determine that the second device is a device with a preset user authority, in response to determining that the identity authentication is passed and detecting that the second device enters a preset second distance range and the second device is within a preset direction range of the first device; herein the preset second distance range is within the preset first distance range.

In examples of the disclosure, the first authentication module may further be configured to perform the identity authentication on the second device by exchanging a key with the second device based on the connection.

In examples of the disclosure, the first connection module may further be configured to sort distances between each second device and the first device in response to detecting that a plurality of second devices enter the preset first distance range; and select a preset number of second devices to establish the connection with the preset number of second devices based on the sorting; herein a distance between any of the preset number of second devices that are selected and the first device may be less than a distance between any of second devices that are not selected and the first device.

In examples of the disclosure, the apparatus may further include: a first acquisition module, configured to acquire user identity information stored in the second device based on the connection. The determination module may further be configured to determine that the second device is the device with the preset user authority, in response to detecting that the second device enters the preset second distance range, the second device is within the preset direction range of the first device, and the user identity information belongs to preset target user identity information; herein the preset target user identity information may refer to identity information of a user having the preset user authority.

In examples of the disclosure, the preset user authority may include at least one of: a payment authority; an access control authority; a boarding authority; a viewing authority; or a seat authority.

In examples of the disclosure, the determination module may further be configured to, in response to detecting that the second device enters the preset second distance range and the second device is within the preset direction range of the first device, send a ticket checking instruction to the second device based on the connection; acquire booking information of the second device based on the ticket checking instruction; and in response to determining that the booking information matches preset booking information, determine that the second device is the device with the preset user authority; herein the preset user authority may indicate that a user carrying the second device has a boarding authority or a viewing authority.

In examples of the disclosure, the booking information may include seat number information. The determination module may further be configured to, in response to detecting that the second device enters the preset second distance range and the second device is within the preset direction range of the first device, determine a seat number of the second device in a space where the second device is located according to a relative distance, a relative direction, and a preset corresponding relationship between the second device and the first device, the preset corresponding relationship including a corresponding relationship between a distance, a direction and a seat number; and in response to determining that the seat number matches a seat number in the booking information, determine that the second device is the device with the preset user authority; herein the preset user authority may indicate that a user carrying the second device has a seat authority.

In examples of the disclosure, both the first device and the second device may include UWB modules, and the apparatus may further include: a detection module, configured to detect whether the second device enters the preset first distance range or the preset second distance range by means of the UWB modules.

An example of the disclosure provides an identity recognition apparatus. The apparatus is applied to a second device and includes: a second connection module, configured to establish a connection with a first device in response to entering a preset first distance range of the first device; a second authentication module, configured to perform identity authentication with the first device based on the connection; and a second acquisition module, configured to, when the identity authentication is passed, in response to entering a preset second distance range of the first device and the second device being within a preset direction range of the first device, acquire a preset user authority; herein the preset second distance range is within the preset first distance range.

In examples of the disclosure, the second authentication module may further be configured to perform the identity authentication with the first device by exchanging a key with the first device based on the connection.

In examples of the disclosure, the second acquisition module may further be configured to send stored user identity information to the first device based on the connection, in response to entering the preset second distance range of the first device and the second device being within the preset direction range of the first device; herein the user identity information may be used for determining that the second device is a device with a preset user authority in case that the first device determines that the user identity information belongs to preset target user identity information, and the preset target user identity information may refer to identity information of a user having the preset user authority.

In examples of the disclosure, the second acquisition module may further be configured to, in response to entering the preset second distance range of the first device and the second device being within the preset direction range of the first device, receive a ticket checking instruction sent by the first device based on the connection; and send booking information to the first device according to the ticket checking instruction; herein the booking information may be used for, when the first device determines that the booking information matches preset booking information, determining that the second device is a device with a preset user authority, and the preset user authority may indicate that a user carrying the second device has a boarding authority or a viewing authority.

In examples of the disclosure, both the first device and the second device may include UWB modules, and the UWB modules may be used for the first device to determine whether the second device enters the preset first distance range or the preset second distance range.

An example of the disclosure provides a device, which includes: a processor; and a memory configured to store instructions executable by the processor. The processor is configured to execute the identity recognition method as described in the first aspect or second aspect above.

An example of the disclosure provides a storage medium, which includes: when instructions in the storage medium are executed by a processor of a first device, the first device implements the identity recognition method as described in the first aspect above; or when instructions in the storage medium are executed by a processor of a second device, the second device implements the identity recognition method as described in the second aspect above.

The technical solutions provided by the examples of the disclosure may include the following beneficial effects.

In the disclosure, by setting the preset first distance range, the connection with the second device is established when the second device enters the preset first distance range, so as to perform the identity authentication on the second device; when the identity authentication is passed, it is determined that second device is a device with a preset user authority on the basis that the second device enters the preset direction range and the preset second distance range is within the preset first distance range. On the one hand, the identity authentication is performed followed by authority granting in combination with spatial extent, which can strengthen security in identity recognition; on the other hand, both dependence on light conditions and requirement for user's active cooperation are omitted, so that a senseless user experience can be provided; and moreover, preset user authority confirmation for multiple devices simultaneously may be supported, so that identity authentication efficiency can be improved. It is to be understood that the above general descriptions and detailed descriptions below are only exemplary and explanatory and not intended to limit the disclosure Other examples of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the present disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. An identity recognition method, comprising:
    establishing, by a first device, a connection with a second device in response to detecting that the second device enters a preset first distance range;
    performing, by the first device, identity authentication on the second device based on the connection; and
    determining that the second device is with a preset user authority, in response to determining that the identity authentication is passed, and in response to detecting that the second device enters a preset second distance range and the second device is within a preset direction range of the first device; wherein the preset second distance range is within the preset first distance range, wherein the method further comprises:
    acquiring user identity information stored in the second device based on the connection; and
    wherein determining that the second device is with the preset user authority in response to detecting that the second device enters the preset second distance range and the second device is within the preset direction range of the first device comprises:
    determining that the second device is with the preset user authority in response to detecting that the second device enters the preset second distance range, the second device is within the preset direction range of the first device, and the user identity information belongs to preset target user identity information; wherein the preset target user identity information comprises identity information of a user having the preset user authority.

2. The method of claim 1, wherein performing the identity authentication on the second device based on the connection comprises:
    performing the identity authentication on the second device by exchanging a key with the second device based on the connection.

3. The method of claim 1, wherein establishing the connection with the second device in response to detecting that the second device enters the preset first distance range comprises:
    in response to detecting that a plurality of second devices enter the preset first distance range, sorting distances between each second device and the first device; and
    selecting a preset number of second devices and establishing the connection with the preset number of second devices based on the sorting; wherein a distance between each of the preset number of second devices that are selected and the first device is less than a distance between each of second devices that are not selected and the first device.

4. The method of claim 1, wherein the preset user authority comprises at least one of: a payment authority; an access control authority; a boarding authority; a viewing authority; or a seat authority.

5. The method of claim 1, wherein determining that the second device is with the preset user authority in response to detecting that the second device enters the preset second distance range and the second device is within the preset direction range of the first device further comprises:
    sending a ticket checking instruction to the second device based on the connection in response to detecting that the second device enters the preset second distance range and the second device is within the preset direction range of the first device;
    acquiring booking information of the second device based on the ticket checking instruction; and
    determining that the second device is the device with the preset user authority in response to determining that the booking information matches preset booking information; wherein the preset user authority indicates that a user carrying the second device has a boarding authority or a viewing authority.

6. The method of claim 5, wherein the booking information comprises seat number information; and
    wherein determining that the second device is with the preset user authority in response to detecting that the second device enters the preset second distance range and the second device is within the preset direction range of the first device further comprises:
    in response to detecting that the second device enters the preset second distance range and the second device is within the preset direction range of the first device, determining a seat number of the second device in a space where the second device is located according to a relative distance, a relative direction, and a preset corresponding relationship between the second device and the first device; wherein the preset corresponding relationship comprises a corresponding relationship between a distance, a direction and a seat number; and
    determining that the second device is the device with the preset user authority in response to determining that the seat number matches a seat number in the booking information; wherein the preset user authority indicates that a user carrying the second device has a seat authority.

7. The method of claim 1, wherein both the first device and the second device comprise ultra width band (UWB) modules, and the method further comprises:
    detecting whether the second device enters the preset first distance range or the preset second distance range by means of the UWB modules.

8. An identity recognition method, comprising:
    establishing, by a second device, a connection with a first device in response to entering a preset first distance range of the first device;
    performing, by the second device, identity authentication with the first device based on the connection; and
    when the identity authentication is passed, in response to entering a preset second distance range of the first device and the second device being within a preset direction range of the first device, acquiring a preset user authority; wherein the preset second distance range is within the preset first distance range,
    wherein acquiring the preset user authority in response to entering the preset second distance range of the first device and the second device being within the preset direction range of the first device comprises:
    sending stored user identity information to the first device based on the connection, in response to entering the preset second distance range of the first device and the second device being within the preset direction range of the first device; wherein the user identity information is used for determining that the second device is with a preset user authority in case that the first device determines that the user identity information belongs to preset target user identity information, and the preset target user identity information comprises identity information of a user having the preset user authority.

9. The method of claim 8, wherein performing the identity authentication with the first device based on the connection comprises:
performing the identity authentication by exchanging a key with the first device based on the connection.

10. The method of claim 8, wherein acquiring the preset user authority in response to entering the preset second distance range of the first device and the second device being within the preset direction range of the first device further comprises:
receiving a ticket checking instruction sent by the first device based on the connection in response to entering the preset second distance range of the first device and the second device being within the preset direction range of the first device; and
sending booking information to the first device according to the ticket checking instruction; wherein the booking information is used for, when the first device determines that the booking information matches preset booking information, determining that the second device is with a preset user authority, and the preset user authority indicates that a user carrying the second device has a boarding authority or a viewing authority.

11. The method of claim 8, wherein both the first device and the second device comprise ultra width band (UWB) modules, and the UWB modules are used for the first device to determine whether the second device enters the preset first distance range or the preset second distance range.

12. An identity recognition apparatus, which is applied to a first device, comprising:
a processor; and
a memory for storing instructions executable by the processor;
wherein the processor is configured to:
establish a connection with a second device in response to detecting that the second device enters a preset first distance range;
perform identity authentication on the second device based on the connection; and
determine that the second device is with a preset user authority, in response to determining that the identity authentication is passed, and in response to detecting that the second device enters a preset second distance range and the second device is within a preset direction range of the first device; wherein the preset second distance range is within the preset first distance range,
wherein the processor is further configured to:
acquire user identity information stored in the second device based on the connection; and
determine that the second device is with the preset user authority, in response to detecting that the second device enters the preset second distance range, the second device is within the preset direction range of the first device, and the user identity information belongs to preset target user identity information; wherein the preset target user identity information comprises identity information of a user having the preset user authority.

13. The apparatus of claim 12, wherein the processor is further configured to perform the identity authentication on the second device by exchanging a key with the second device based on the connection.

14. The apparatus of claim 12, wherein the processor is further configured to:
sort distances between each second device and the first device in response to detecting that a plurality of second devices enter the preset first distance range; and
select a preset number of second devices and establish the connection with the preset number of second devices based on the sorting; wherein a distance between each of the preset number of second devices that are selected and the first device is less than a distance between each of second devices that are not selected and the first device.

15. The apparatus of claim 12,
wherein the preset target user identity information comprises identity information of a user having the preset user authority; or wherein the processor is further configured to, in response to detecting that the second device enters the preset second distance range and the second device is within the preset direction range of the first device, send a ticket checking instruction to the second device based on the connection; acquire booking information of the second device based on the ticket checking instruction; and in response to determining that the booking information matches preset booking information, determine that the second device is the device with the preset user authority; wherein the preset user authority indicates that a user carrying the second device has a boarding authority or a viewing authority; or wherein the booking information comprises seat number information; and the processor is further configured to, in response to detecting that the second device enters the preset second distance range and the second device is within the preset direction range of the first device, determine a seat number of the second device in a space where the second device is located according to a relative distance, a relative direction, and a preset corresponding relationship between the second device and the first device, the preset corresponding relationship comprising a corresponding relationship between a distance, a direction and a seat number; and in response to determining that the seat number matches a seat number in the booking information, determine that the second device is the device with the preset user authority; wherein the preset user authority indicates that a user carrying the second device has a seat authority.

16. The apparatus of claim 12, wherein both the first device and the second device comprise ultra width band (UWB) modules, and the processor is further configured to:
detect whether the second device enters the preset first distance range or the preset second distance range by means of the UWB modules.

17. An identity recognition apparatus implementing operations of the identity recognition, which is applied to a second device, comprising:
a processor; and
a memory for storing instructions executable by the processor;
wherein the processor is configured to:
establish a connection with a first device in response to entering a preset first distance range of the first device;
perform identity authentication with the first device based on the connection; and
when the identity authentication is passed, in response to entering a preset second distance range of the first device and the second device being within a preset direction range of the first device, acquire a preset user authority; wherein the preset second distance range is within the preset first distance range, wherein the processor is further configured to send stored user identity information to the first device based on the connection, in response to entering the preset second distance range of the first device and the second device being within the preset direction range of the first device; wherein the user identity information is used for determining that the second device is with the preset user authority in case that the first device determines that the user identity information belongs to preset target user identity information, and the preset target user identity information refers to identity information of a user having the preset user authority.

18. The apparatus of claim 17, wherein the processor is further configured to, in response to entering the preset second distance range of the first device and the second device being within the preset direction range of the first device, receive a ticket checking instruction sent by the first device based on the connection; and send booking information to the first device according to the ticket checking instruction; wherein the booking information is used for, when the first device determines that the booking information matches preset booking information, determining that the second device is with a preset user authority, and the preset user authority indicates that a user carrying the second device has a boarding authority or a viewing authority.

* * * * *